(12) United States Patent
Seo et al.

(10) Patent No.: US 11,258,144 B2
(45) Date of Patent: Feb. 22, 2022

(54) BATTERY CELL INCLUDING SHAPE RETENTION MEMBER

(71) Applicant: LG Chem, Ltd., Seoul (KR)

(72) Inventors: Tai Joon Seo, Daejeon (KR); Woo Yong Lee, Daejeon (KR)

(73) Assignee: LG Energy Solution, Ltd.

( * ) Notice: Subject to any disclaimer, the term of this patent is extended or adjusted under 35 U.S.C. 154(b) by 104 days.

(21) Appl. No.: 16/414,019

(22) Filed: May 16, 2019

(65) Prior Publication Data

US 2019/0363314 A1 Nov. 28, 2019

(30) Foreign Application Priority Data

May 23, 2018 (KR) .................. 10-2018-0058296

(51) Int. Cl.
| | |
|---|---|
| *H01M 50/557* | (2021.01) |
| *H01M 10/04* | (2006.01) |
| *H01M 50/54* | (2021.01) |
| *H01M 50/183* | (2021.01) |
| *H01M 50/543* | (2021.01) |

(52) U.S. Cl.
CPC ..... *H01M 50/557* (2021.01); *H01M 10/0436* (2013.01); *H01M 50/183* (2021.01); *H01M 50/54* (2021.01); *H01M 50/543* (2021.01)

(58) Field of Classification Search
CPC .. H01M 50/557; H01M 50/54; H01M 50/183; H01M 50/543; H01M 10/0436
See application file for complete search history.

(56) References Cited

U.S. PATENT DOCUMENTS

| | | | |
|---|---|---|---|
| 8,491,673 | B2 | 7/2013 | Daidoji et al. |
| 2007/0202399 | A1* | 8/2007 | Shin .................... H01M 2/0277 429/181 |
| 2008/0060189 | A1 | 3/2008 | Daidoji et al. |
| 2012/0009443 | A1* | 1/2012 | Baek ................... H01M 50/209 429/7 |

FOREIGN PATENT DOCUMENTS

| | | |
|---|---|---|
| JP | 2008066170 A | 3/2008 |
| JP | 5114036 B2 | 1/2013 |

(Continued)

*Primary Examiner* — Milton I Cano
*Assistant Examiner* — Jenna Shulman
(74) *Attorney, Agent, or Firm* — Lerner, David, Littenberg, Krumholz & Mentlik, LLP

(57) ABSTRACT

Disclosed herein is a battery cell including an electrode assembly having a positive electrode, a negative electrode, and a separator interposed therebetween, a battery case including an upper case and a lower case, corresponding portions of outer edges of the upper case and the lower case being thermally fused to one another in a state in which the electrode assembly is received in a reception unit formed by the upper case and the lower case such that the battery case has a sealed portion extending around the reception unit, an electrode lead electrically connected to the electrode assembly, the electrode lead protruding outwards from the battery case through the sealed portion in the state in which insulative films are attached to opposite surfaces of the electrode lead at the sealed portion, and a shape retention member interposed between the outer edges of the upper case and the lower case.

9 Claims, 2 Drawing Sheets

(56) References Cited

FOREIGN PATENT DOCUMENTS

| | | | |
|---|---|---|---|
| KR | 20140137603 | A | 12/2014 |
| KR | 20160071222 | A | 6/2016 |
| KR | 20160080559 | A | 7/2016 |
| KR | 20160120090 | A | 10/2016 |
| KR | 101722820 | B1 | 4/2017 |
| KR | 20170082239 | A | 7/2017 |
| KR | 20170136880 | A | 12/2017 |
| KR | 20180007261 | A | 1/2018 |

* cited by examiner

[FIG. 1a]
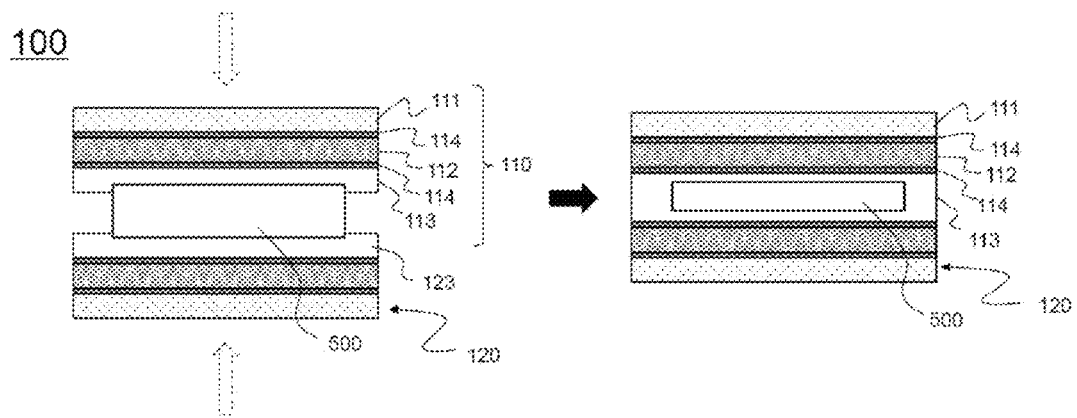
[FIG. 1b]
[FIG. 2a]
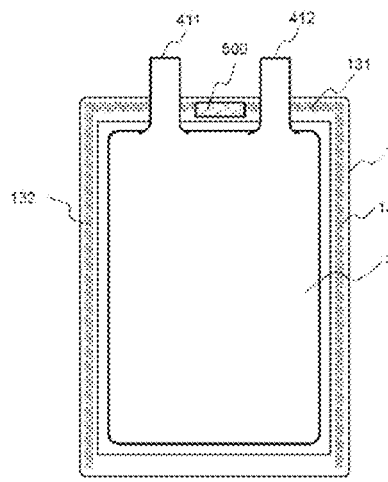
[FIG. 2b]
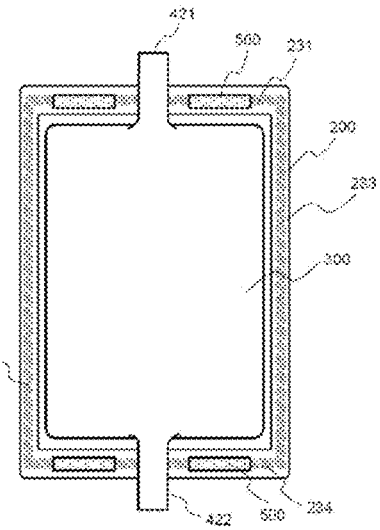

[FIG. 3a]
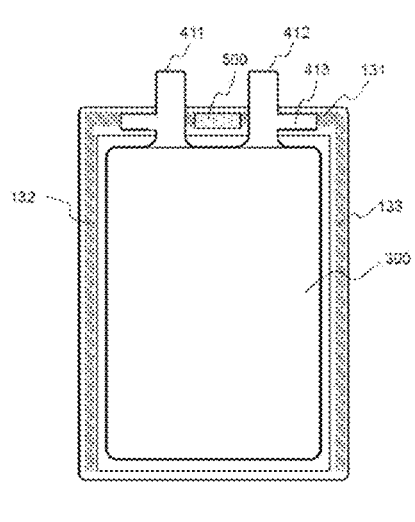
[FIG. 3b]
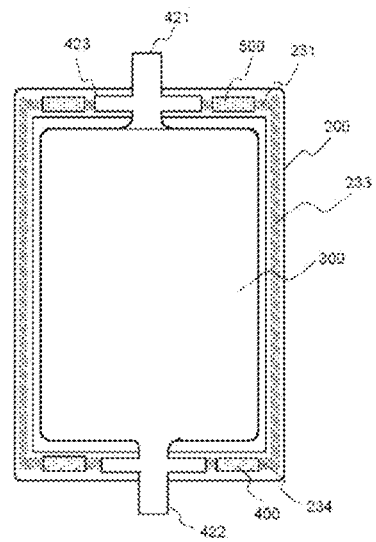
[FIG. 4a]
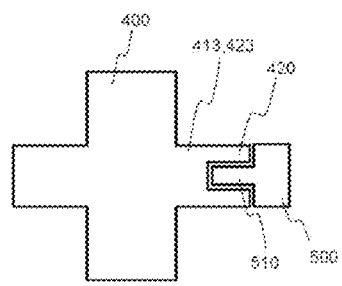
[FIG. 4b]
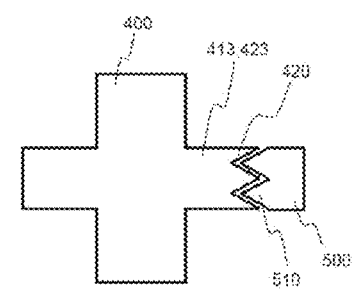
[FIG. 4c]
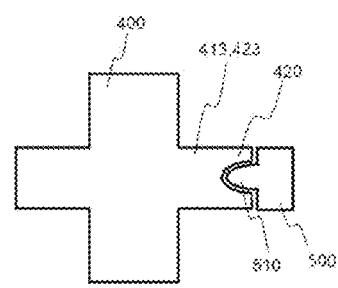

BATTERY CELL INCLUDING SHAPE RETENTION MEMBER

CROSS-REFERENCE TO RELATED APPLICATIONS

This application claims the benefit of Korean Patent Application No. 10-2018-0058296, filed on May 23, 2018 with the Korean Intellectual Property Office, the disclosure of which is herein incorporated by reference in its entirety.

TECHNICAL FIELD

The present invention relates to a pouch-shaped battery cell having a sealed portion, which is formed so as to be rigid, and more particularly to a pouch-shaped battery cell including a shape retention member thermally fused in the state of being interposed between an upper case and a lower case for receiving an electrode assembly.

BACKGROUND ART

Battery cells are classified into a cylindrical battery cell, which is configured to have a structure in which an electrode assembly is mounted in a cylindrical metal can, a prismatic battery cell, which is configured to have a structure in which an electrode assembly is mounted in a prismatic metal can, and a pouch-shaped battery cell, which is configured to have a structure in which an electrode assembly is mounted in a pouch-shaped battery case made of an aluminum laminate sheet, based on the shape of a battery case.

Among these battery cells, the pouch-shaped battery cell, which can be stacked with high integration, has high energy density per unit weight, is inexpensive, and can be easily modified, has attracted considerable attention.

The pouch-shaped battery cell includes an electrode assembly, electrode tabs extending from the electrode assembly, an electrode lead welded to the electrode tabs, and a battery case for receiving the electrode assembly.

The battery case is made of a laminate sheet including an outer resin layer, a metal foil layer, and an inner resin layer. The battery case is sealed by applying heat and pressure to contact regions of an upper case and a lower case constituting the battery case such that the inner resin layers of the upper case and the lower case are attached to each other by thermal fusion. The inner resin layers melt when heat is applied thereto, whereby freedom of mobility is increased, and are then cured when the inner resin layers are cooled, whereby the inner resin layers are adhered to each other.

The part of the sealed portion from which the electrode lead does not protrude may be uniformly sealed, since the inner resin layers of the upper case and the lower case directly contact each other. However, the part of the sealed portion from which the electrode lead protrudes is characterized by a poor seal, whereby the inner resin layers may be separated from each other, since the electrode lead is adhered to each of the inner resin layers. As a result, the battery cell may be defective. In order to solve this, an insulative film is attached to a portion of each of the upper and lower surfaces of the electrode lead in order to improve the seal with the battery case and to guarantee electrical insulation. In this case, however, the thickness of the part of the sealed portion at which the electrode lead is formed may not be uniform, and the sealed portion may be deformed due to the weight of the electrode lead.

In the case in which the thickness of the sealed portion is not uniform, the sealed portion may be cracked or damaged even by a small physical impact, whereby the inner aluminum layer may be exposed. As a result, it is not possible to guarantee the insulation of the battery cell and to effectively prevent the battery cell from contacting external moisture and air. Since the battery cell is repeatedly charged and discharged a large number of times for a long time during the use of the battery cell, the above problem may become serious as the time for which the battery cell is used is increased.

In particular, when a leakage test is performed in order to check whether there is leakage from the battery cell during the manufacture of the battery cell, the sealed portion of the battery cell may become further deformed, since high pressure and atmospheric pressure are alternately applied to the battery cell.

In connection therewith, Patent Document 1 discloses a pouch-shaped sheathing member for secondary batteries configured such that a reinforcing sealant member is additionally provided in a sealed portion. The reinforcing sealant member melts together with an inner sealant layer when the sealed portion is heated and pressurized by a sealing tool, and then the reinforcing sealant member is discharged toward an electrode assembly reception unit through a gap between upper and lower pouches in order to form an inner coating portion for protecting an inner sealed end. However, it is not possible for the reinforcing sealant member to rigidly support the part of the sealed portion from which an electrode lead protrudes.

Patent Document 2 discloses a structure in which, in order to weld a plurality of electrode tabs, the width of the portion of an electrode lead that is welded to the electrode tabs is increased.

Patent Document 3 discloses a battery cell configured such that an electrode lead is enlarged in order to disperse heat concentrated on the electrode lead during charging and discharging of the battery cell.

Patent Document 4 discloses a secondary battery including a T-shaped electrode tab (lead) constituted by an elongated length portion and wing portions extending from one end of the length portion in opposite directions so as to be perpendicular to the length portion.

Patent Documents 2 to 4 disclose electrode leads having variable widths, but do not disclose a structure for rigidly forming a sealed portion or the effects thereof.

PRIOR ART DOCUMENT

Patent Document

Korean Patent Application Publication No. 2016-0080559
Japanese Patent Application Publication No. 2008-66170
Korean Patent Application Publication No. 2017-0082239
Korean Patent Application Publication No. 2016-0071222

DISCLOSURE

Technical Problem

The present invention has been made in view of the above problems and other technical problems that have yet to be resolved, and it is an object of the present invention to provide a pouch-shaped battery cell including a shape retention member provided in a sealed portion of a battery case for receiving an electrode assembly in order to rigidly form the sealed portion, thereby improving the safety of the battery cell.

Technical Solution

In accordance with an aspect of the present invention, the above and other objects can be accomplished by the provision of a battery cell including an electrode assembly having a positive electrode, a negative electrode, and a separator interposed between the positive electrode and the negative electrode, a battery case including an upper case and a lower case, corresponding portions of outer edges of the upper case and the lower case being thermally fused to one another in a state in which the electrode assembly is received in a reception unit formed by the upper case and the lower case such that the battery case has a sealed portion extending around the reception unit, an electrode lead electrically connected to the electrode assembly, the electrode lead protruding outwards from the battery case through the sealed portion in the state in which insulative films are attached to opposite surfaces of the electrode lead at the sealed portion, and a shape retention member interposed between the outer edges of the upper case and the lower case.

The shape retention member may be disposed within the sealed portion of the battery case, and the shape retention member may be thermally fused to the battery case in the state of being interposed between the outer edges of the upper case and the lower case.

The shape retention member may include an insulative film.

The shape retention member may have a thickness equal to or smaller than the thickness of the electrode lead, the thickness of the shape retention member and the thickness of the electrode lead each being defined in a direction perpendicular to a plane in which the electrode assembly extends.

The shape retention member may be made of a material that has a melting point higher than a thermal fusion temperature of the sealed portion.

An adhesive material may extend between opposite surfaces of the shape retention member and the upper and lower cases.

The electrode lead may include an extension having a first shape that is complementary to a corresponding second shape of a portion of the shape retention member, the complimentary first and second shapes including a concave shape and a complementary convex shape.

The electrode lead may include an extension having a width that extends into the sealed portion of the battery case and is larger than a width of the electrode lead, the width of the electrode lead and the width of the extension each being defined in a direction parallel to a plane in which the electrode assembly extends.

The extension may have a first shape that is complementary to a corresponding second shape of a portion of the shape retention member, the complimentary first and second shapes including a concave shape and a complementary convex shape, and the shape retention member may be coupled to the extension through engagement between the complimentary first and second shapes.

The battery cell may be configured such that a height of the sealed portion of the battery case from a bottom surface thereof may be uniform, the height of the sealed portion being defined in a direction perpendicular to a plane in which the electrode assembly extends.

In accordance with another aspect of the present invention, there is provided a battery pack including a pouch-shaped battery cell configured to have a structure in which a protection circuit module (PCM) is mounted in a sealed portion thereof.

Specifically, the battery pack may be used as a power source for a device requiring the ability to withstand high temperatures, a long lifespan, high rate characteristics, etc. Specific examples of the device may include a mobile electronic device, a wearable electronic device, a power tool driven by a battery-powered motor, an electric automobile, such as an electric vehicle (EV), a hybrid electric vehicle (HEV), or a plug-in hybrid electric vehicle (PHEV), an electric two-wheeled vehicle, such as an electric bicycle (E-bike) or an electric scooter (E-scooter), an electric golf cart, and an energy storage system. However, the present invention is not limited thereto.

The structure and manufacturing method of the device are well known in the art to which the present invention pertains, and thus a detailed description thereof will be omitted.

Effects of the Invention

As is apparent from the above description, the battery cell according to the present invention includes a shape retention member disposed in a sealed portion formed at the side thereof from which an electrode lead protrudes. Consequently, it is possible to form the sealed portion such that the thickness of the sealed portion is uniform and to increase the physical strength of the sealed portion, whereby it is possible to prevent a battery case from being damaged due to being dropped, vibrated, or having an external impact, such as high pressure, applied thereto.

The shape retention member is applicable to a curved battery cell, and it is possible to prevent the sealed portion from being wrinkled when the battery cell is bent.

In addition, the sealed portion, through which the electrode lead protrudes, is formed so as to be flat, whereby the height of the sealed portion from the bottom surface of the battery cell is uniform. Consequently, it is possible to easily mount a protection circuit module (PCM) in the sealed portion.

BRIEF DESCRIPTION OF DRAWINGS

FIGS. 1a and 1b are vertical sectional views showing the process in which a shape retention member is thermally fused in the state of being disposed in a sealed portion.

FIGS. 2a and 2b are plan views showing pouch-shaped battery cells according to embodiments of the present invention.

FIGS. 3a and 3b are plan views showing pouch-shaped battery cells according to other embodiments of the present invention.

FIGS. 4a, 4b, and 4c are plan views showing an electrode lead and a shape retention member according to further embodiments of the present invention.

DETAILED DESCRIPTION OF THE INVENTION

A pouch-shaped battery cell according to the present invention may include an electrode assembly having a positive electrode/separator/negative electrode structure, a battery case including an upper case and a lower case, corresponding portions of outer edges of the upper case and the lower case being thermally fused in the state in which the electrode assembly is received in a reception unit formed in the battery case such that the battery case has a sealed portion, and an electrode lead electrically connected to the electrode assembly, the electrode lead protruding outwards from the battery case via the sealed portion in the state in which lead films are attached to opposite surfaces of the electrode lead, wherein a shape retention member may be interposed between the outer edges of the upper case and the lower case.

Not only a unidirectional pouch-shaped battery cell, configured to have a structure in which electrode terminals, each of which is constituted by electrode tabs and an electrode lead connected to the electrode tabs, are formed at one end thereof, but also a bidirectional pouch-shaped battery cell, configured to have a structure in which electrode terminals are formed at opposite ends thereof, may fall within the scope of the invention as embodiments of the battery cell according to the present invention.

The battery case may include an upper case and a lower case.

The upper case or the lower case may be provided with a reception unit for receiving the electrode assembly. The battery case may be a pouch-shaped battery case.

The battery case may be made of a laminate sheet including a resin layer and a metal layer. Preferably, the laminate sheet may be configured to have a structure including an inner resin layer, which is thermally fused, a metal layer, and an external resin layer, which exhibits high durability.

The external resin layer is configured to guarantee the insulation of the battery cell from the outside. The material for the external resin layer is not particularly restricted as long as the material for the external resin layer is a material that is insulative and is irresponsive to an electrolytic solution. The external resin layer may be made of polyethylene, polypropylene, polyester, polyethylene terephthalate (PET), nylon, vinyl chloride, polyimide, or polyphenylene sulfide. Preferably, the external resin layer is made of polyethylene terephthalate (PET), nylon, or a mixture thereof.

The metal layer may be made of metal that is capable of preventing gas from being introduced into the battery cell and being ductile so as to have a thin-film shape. For example, the metal layer may be made of one selected from the group consisting of copper (Cu), aluminum (Al), nickel (Ni), iron (Fe), carbon (C), chrome (Cr), manganese (Mn), and an alloy of at least two metals thereof. However, the material for the metal layer is not particularly restricted. Preferably, the metal layer is made of aluminum.

The inner resin layer may be made of a polymer resin that exhibits a thermal fusion property (a thermal adhesive property) and a low hygroscopic property, which is necessary to inhibit permeation of an electrolytic solution, and is not expanded and not corroded by the electrolytic solution. For example, the inner resin layer may be made of at least one kind of polyolefin resin, such as polyethylene (PE), polypropylene (PP), a random copolymer thereof, and a propylene/butylene/ethylene copolymer. Preferably, the inner resin layer is made of at least one kind of polypropylene-based resin, such as a polypropylene-based homopolymer, a polypropylene-based copolymer, and cast polypropylene (cPP). However, the present invention is not limited thereto.

The electrode assembly is configured to have a structure in which a positive electrode plate and a negative electrode plate are provided in the state in which a separator is disposed between the positive electrode plate and the negative electrode plate. Preferably, the electrode assembly may be configured to have a structure in which a single positive electrode plate and a single negative electrode plate are wound in the state in which a separator is disposed between the positive electrode plate and the negative electrode plate or to have a structure in which a plurality of positive electrode plates and a plurality of negative electrode plates are alternately stacked in the state in which separators are disposed respectively between the positive electrode plates and the negative electrode plates.

An active material slurry may be applied to each of the positive electrode plate and the negative electrode plate. The active material slurry may be generally formed by stirring a granular active material, an auxiliary conductor, a binder, and a plasticizer in the state in which a solvent is added thereto.

The electrode lead may be a positive electrode lead or a negative electrode lead. A conductive aluminum member may be used as the positive electrode lead, and a copper member or a copper member coated with nickel may be used as the negative electrode lead.

An insulative film may be attached to a portion of the electrode lead in order to improve the seal with the battery case and to guarantee electrical insulation.

The shape retention member may be a film-type shape retention member. The shape retention member may be interposed between the outer edge of the upper case and the outer edge of the lower case, and may be fixed to the sealed portion during thermal fusion.

The shape retention member is located in the sealed portion at the side from which the electrode lead protrudes. The thickness of the shape retention member may be equal to or smaller than the thickness of the electrode lead.

Specifically, the thickness of the electrode lead may range from 0.05 mm to 0.1 mm, and the thickness of the shape retention member may be 0.05 mm or more and 0.1 mm or less.

If the thickness of the shape retention member is less than 0.05 mm, it is not possible to obtain desired force for supporting the sealed portion. If the thickness of the shape retention member is greater than 0.1 mm, the thickness of the part of the sealed portion in which the shape retention member is disposed becomes greater than the thickness of the part of the sealed portion in which the electrode lead is disposed, whereby the overall thickness of the sealed portion becomes nonuniform.

The shape retention member is fixed by thermal fusion. In order to prevent the shape retention member from melting at the temperature for thermal fusion, therefore, the shape retention member may be made of a material that has a melting point higher than the temperature at which the sealed portion is thermally fused.

In connection with the temperature for thermal fusion necessary to seal the battery cell, the inner resin layer may be made of polypropylene, which has a melting point of 130° C. to 145° C., and the thermal fusion for sealing the battery cell may be performed within a temperature range of 160° C. to 200° C. Consequently, the shape retention member may be made of a material having a melting point of 200° C. or higher.

In the case in which the shape retention member may be made of a material having a melting point lower than the temperature for thermal fusion, the shape retention member may melt (vitrify) when the battery case is thermally fused, whereby it is not possible for the shape retention member to rigidly support the sealed portion, and dielectric breakdown of the battery cell may easily occur.

Preferably, the shape retention member may be made of the same material as the electrode lead or a polymer material having a high melting point.

In the case in which the shape retention member is made of the same material as the electrode lead, the shape retention member that is adjacent to the negative electrode lead may be made of the same material as the negative electrode lead, and the shape retention member that is adjacent to the positive electrode lead may be made of the same material as the positive electrode lead.

In the same manner as the electrode lead, an insulative film may be attached to the shape retention member, or an adhesive material may be added to each of opposite surfaces of the shape retention member, in order to improve the seal with the battery case and to guarantee electrical insulation.

The adhesive material is not particularly restricted as long as the adhesive material can be adhered by thermal fusion. Specifically, the adhesive material may be made of a resin that exhibits an adhesion property when being cured, for example, a resin including at least one thermosetting functional group, such as a glycidyl group, an isocyanate group, a hydroxy group, a carboxyl group, or an amide group. Preferably, the adhesive material is made of the same material as the inner resin layer in order to increase the force of adhesion with the inner resin layer.

The electrode lead may include an extension configured to have a structure in which the width of the portion of the extension that extends via the sealed portion is larger than the length of the electrode lead between opposite ends thereof.

The extension may perform the same function as the shape retention member.

In order to more rigidly form the sealed portion, a concave-convex portion may be formed in a portion of each of opposite ends of the extension, and a concave-convex portion may be formed in the portion of the shape retention member that contacts the extension, whereby the shape retention member may be coupled to the extension through engagement therewith.

Hereinafter, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

Wherever possible, the same reference numbers will be used throughout the drawings to refer to parts that perform similar functions or operations. Meanwhile, in the case in which one part is 'connected' to another part in the following description of the present invention, not only may the one part be directly connected to the another part, but also, the one part may be indirectly connected to the another part via a further part. In addition, that a certain element is 'included' means that other elements are not excluded, but may be further included unless mentioned otherwise.

Reference will now be made in detail to the preferred embodiments of the present invention, examples of which are illustrated in the accompanying drawings.

FIGS. 1a and 1b are vertical sectional views showing the process in which a shape retention member is thermally fused in the state of being disposed in a sealed portion.

Referring to FIGS. 1a and 1b, a pouch-shaped battery case 100 includes an upper case 110 and a lower case 120. The upper case 110 is configured such that an outer resin layer 111, a metal layer 112, and an inner resin layer 113 are sequentially stacked in that order from the outside to the inside thereof and such that an adhesive layer 114 is interposed between the outer resin layer 111 and the metal layer 112 and between the metal layer 112 and the inner resin layer 113 in order to increase the force of adhesion between the outer resin layer 111 and the metal layer 112 and between the metal layer 112 and the inner resin layer 113. The lower case 120 is configured to have the same structure as the upper case 110.

A film-type shape retention member 500 is disposed between the inner resin layer 113 of the upper case 110 and an inner resin layer 123 of the lower case 120.

In the case in which heat and pressure are applied to the upper surface and the lower surface of the pouch-shaped battery case 100 in the directions indicated by the arrows, as shown in FIGS. 1a and 1b, the inner resin layers 113 and 123 of the upper and lower cases 110 and 120 melt to form a single layer. At this time, the inner resin layers 113 and 123 surround the outer surface of the shape retention member 500, whereby the shape retention member 500 may be fixed.

Embodiment 1

FIGS. 2a and 2b are plan views showing pouch-shaped battery cells according to embodiments of the present invention.

In the case of a unidirectional battery cell shown in FIG. 2a, a shape retention member 500 is interposed between a positive electrode lead 411 and a negative electrode lead 412. In the case of a bidirectional battery cell shown in FIG. 2b, shape retention members 500 are disposed at opposite sides of each of a positive electrode lead 421 and a negative electrode lead 422.

The shape retention member for the unidirectional battery cell may be made of an insulative material in order to prevent the electrodes from contacting each other.

Embodiment 2

FIGS. 3a and 3b are plan views showing pouch-shaped battery cells according to other embodiments of the present invention.

An electrode lead 400 includes an extension 413 or 423 configured to have a structure in which the width of the portion of the extension extending via a sealed portion is larger than the length of the electrode lead between the opposite ends thereof.

That is, the electrode lead may be configured to have a "+" shape or a " ┠ " shape.

a unidirectional battery cell and a bidirectional battery cell may include an electrode lead 400 configured to have a " ┠ " shape, a " ┨ " shape or a "+" shape.

In the case of the unidirectional battery cell shown in FIG. 3a, both a positive electrode lead 411 and a negative electrode lead 412 are disposed in a first sealed portion 131. In order to prevent the positive electrode lead 411 and the negative electrode lead 412 from contacting each other, therefore, the positive electrode lead 411 may be configured to have a " ┠ " shape, and the negative electrode lead 412 may be configured to have a ┨ " shape.

In the case of the bidirectional battery cell shown in FIG. 3b, a positive electrode lead 421 is disposed in a first sealed portion 231, and a negative electrode lead 422 is disposed in a fourth sealed portion 234. Consequently, each of the positive electrode lead 421 and the negative electrode lead 422 may be configured to have a "+" shape.

Embodiment 3

FIGS. 4a, 4b, and 4c are plan views showing embodiments of the coupling between the extension of the electrode lead and the shape retention member.

Referring to FIGS. 4a, 4b, and 4c, a concave-convex portion 420 is formed in at least one end of the extension 413 or 423 of the electrode lead 400, and a concave-convex portion 510 is formed in the portion of the shape retention member 500 that contacts the extension 413 or 423.

Although the shape of each of the concave-convex portions 420 and 510 is not particularly restricted, the concave-convex portion 420 or 510 may be configured to have at least one selected from the group consisting of a straight shape, a zigzag shape, and a curved shape, as shown in FIGS. 4a, 4b, and 4c, respectively.

The concave-convex portion 510 of the shape retention member 500 may be configured to have a shape corresponding to the shape of the concave-convex portion 420 of the extension 413 or 423 such that the shape retention member 500 is coupled to the extension 413 or 423 through engagement therewith.

Those skilled in the art to which the present invention pertains will appreciate that various applications and modifications are possible based on the above description, without departing from the scope of the present invention.

The invention claimed is:

1. A battery cell comprising:
   an electrode assembly having a positive electrode, a negative electrode, and a separator interposed between the positive electrode and the negative electrode;
   a battery case comprising an upper case and a lower case, corresponding portions of outer edges of the upper case and the lower case being thermally fused to one another in a state in which the electrode assembly is received in a reception unit formed by at least one of the upper case and the lower case such that the battery case has a sealed portion extending around the reception unit;
   an electrode lead electrically connected to the electrode assembly, the electrode lead protruding outwards from the battery case through the sealed portion in a state in which insulative films are attached to opposite surfaces of the electrode lead at the sealed portion; and
   a shape retention member interposed between the outer edges of the upper case and the lower case, the shape retention member being entirely disposed within the sealed portion of the battery case, the shape retention member and the electrode lead being disposed between the outer edge of the upper case and the outer edge of the lower case that are thermally fused in a state with the shape retention member and the electrode lead not overlapping, and the shape retention member being made of a same material as the electrode lead or a material that has a melting point higher than a thermal fusion temperature of the sealed portion.

2. The battery cell according to claim 1, wherein the shape retention member is thermally fused to the battery case in a state of being interposed between the outer edges of the upper case and the lower case.

3. The battery cell according to claim 1, wherein the shape retention member is comprises an insulative film.

4. The battery cell according to claim 1, wherein the shape retention member has a thickness equal to or smaller than a thickness of the electrode lead, the thickness of the shape retention member and the thickness of the electrode lead each being defined in a direction perpendicular to a plane in which the electrode assembly extends.

5. The battery cell according to claim 1, wherein an adhesive material extends between opposite surfaces of the shape retention member and the upper and lower cases.

6. The battery cell according to claim 1, wherein the battery cell is configured such that a height of the sealed portion of the battery case from a bottom surface thereof is uniform, the height of the sealed portion being defined in a direction perpendicular to a plane in which the electrode assembly extends.

7. The battery cell according to claim 1,
   wherein the electrode lead comprises an extension having a first shape that is complementary to a corresponding second shape of a portion of the shape retention member, the complimentary first and second shapes including a concave shape and a complementary convex shape.

8. The battery cell according to claim 1,
   wherein the electrode lead comprises an extension having a width that extends into the sealed portion of the battery case and is larger than a width of the electrode lead, the width of the electrode lead and the width of the extension each being defined in a direction parallel to a plane in which the electrode assembly extends.

9. The battery cell according to claim 8, wherein
   the extension has a first shape that is complementary to a corresponding second shape of a portion of the shape retention member, the complimentary first and second shapes including a concave shape and a complementary convex shape, and
   the shape retention member is coupled to the extension through engagement between the complimentary first and second shapes.

* * * * *